(12) United States Patent
Gallagher et al.

(10) Patent No.: US 12,326,735 B2
(45) Date of Patent: Jun. 10, 2025

(54) DYNAMIC ACTIVE CONTROL SYSTEM WITH ENGINE CONTROL

(71) Applicant: SEAKEEPER, INC., California, MD (US)

(72) Inventors: Michael Gallagher, Cleveland, OH (US); Andrew Semprevivo, Wyomissing, PA (US); John Adams, Russell Springs, KY (US)

(73) Assignee: SEAKEEPER, INC., California, MD (US)

( * ) Notice: Subject to any disclaimer, the term of this patent is extended or adjusted under 35 U.S.C. 154(b) by 186 days.

(21) Appl. No.: 17/871,861

(22) Filed: Jul. 22, 2022

(65) Prior Publication Data

US 2023/0021635 A1 Jan. 26, 2023

Related U.S. Application Data

(60) Provisional application No. 63/225,291, filed on Jul. 23, 2021.

(51) Int. Cl.
*G05D 1/00* (2024.01)
*B63B 39/04* (2006.01)
(Continued)

(52) U.S. Cl.
CPC ........... *G05D 1/0875* (2013.01); *B63B 39/04* (2013.01); *B63B 79/10* (2020.01); *B63B 79/40* (2020.01); *B63H 20/02* (2013.01); *B63H 20/12* (2013.01); *G05D 1/0206* (2013.01); *B63H 2020/003* (2013.01); *B63H 2021/216* (2013.01)

(58) Field of Classification Search
CPC .... G05D 1/0875; G05D 1/0206; B63B 39/04; B63B 79/10; B63B 79/40; B63B 39/061; B63H 20/02; B63H 20/12; B63H 2020/003; B63H 2021/216
See application file for complete search history.

(56) References Cited

U.S. PATENT DOCUMENTS

| 4,524,942 A | 6/1985 | Kueny |
| 4,749,926 A | 6/1988 | Ontolchik |

(Continued)

FOREIGN PATENT DOCUMENTS

| AU | 783746 B2 | 1/2003 |
| CA | 279547 | 4/1928 |

(Continued)

OTHER PUBLICATIONS

US 11,198,496 B2, 12/2021, Wong et al. (withdrawn)
(Continued)

*Primary Examiner* — Abdalla A Khaled
(74) *Attorney, Agent, or Firm* — Vedder Price P.C.

(57) ABSTRACT

A dynamic active control system (DACS) configured for: (1) total vessel pitch axis control by fast symmetric deployment of water engagement devices (WEDs) or controllers, coupled with engine trim adjustments; (2) total roll and heading control by differentially deploying WEDs to counter rolling motions while simultaneously adjusting engine steering position to counter the steering moment associated with WED delta position; and (3) adjustment of the engine steering angle to counter yaw moments produced by gyroscopic stabilization systems.

25 Claims, 3 Drawing Sheets

(51) Int. Cl.
*B63B 79/10* (2020.01)
*B63B 79/40* (2020.01)
*B63H 20/02* (2006.01)
*B63H 20/12* (2006.01)
*B63H 20/00* (2006.01)
*B63H 21/21* (2006.01)

(56) References Cited

U.S. PATENT DOCUMENTS

| | | |
|---|---|---|
| 5,142,497 A | 8/1992 | Warrow |
| 5,263,432 A | 11/1993 | Davis |
| 5,385,110 A | 1/1995 | Bennett et al. |
| D362,841 S | 10/1995 | Roza |
| 5,474,012 A | 12/1995 | Yamada et al. |
| 6,041,730 A | 3/2000 | Oliverio et al. |
| 6,268,053 B1 | 7/2001 | Woiszwillo et al. |
| 6,273,771 B1 | 8/2001 | Buckley et al. |
| 6,354,237 B1 | 3/2002 | Gaynor et al. |
| 6,417,469 B1 | 7/2002 | Tamura |
| 6,579,072 B2 | 6/2003 | Trousil et al. |
| 6,592,412 B1 | 7/2003 | Geil et al. |
| 6,651,574 B1 | 11/2003 | Ellens et al. |
| 6,659,816 B2 | 12/2003 | Fuse |
| 6,766,962 B2 | 7/2004 | Paul et al. |
| 6,874,441 B2 | 4/2005 | Pigeon |
| D507,543 S | 7/2005 | Ishii et al. |
| 6,928,948 B1 | 8/2005 | Shannon |
| 7,025,026 B2 | 4/2006 | Young et al. |
| 7,040,937 B2 | 5/2006 | Scott et al. |
| 7,059,347 B2 | 6/2006 | Schwartzman |
| 7,128,014 B2 | 10/2006 | Berthiaume et al. |
| 7,128,626 B2 | 10/2006 | Dundra et al. |
| 7,128,627 B2 | 10/2006 | Ferguson |
| 7,137,347 B2 | 11/2006 | Wong et al. |
| 7,140,315 B2 | 11/2006 | Okuyama |
| 7,156,708 B2 | 1/2007 | Dudra |
| 7,171,982 B2 | 2/2007 | Dudra |
| 7,258,072 B2 | 8/2007 | Wong et al. |
| 7,278,367 B1 | 10/2007 | Gonring et al. |
| 7,285,738 B2 | 10/2007 | Lavigne et al. |
| 7,311,058 B1 | 12/2007 | Brooks et al. |
| 7,318,386 B2 | 1/2008 | Dudra et al. |
| D562,753 S | 2/2008 | Wall et al. |
| D562,754 S | 2/2008 | Wall et al. |
| 7,364,482 B1 | 4/2008 | Wong et al. |
| 7,407,420 B1 | 8/2008 | Fetchko et al. |
| 7,479,607 B2 | 1/2009 | Sack et al. |
| 7,497,183 B2 | 3/2009 | Dudra et al. |
| 7,597,552 B2 | 10/2009 | Young et al. |
| 7,601,040 B2 | 10/2009 | Morvillo |
| 7,631,610 B1 | 12/2009 | Wolske |
| 7,641,525 B2 | 1/2010 | Morvillo |
| 7,717,462 B2 | 5/2010 | Liu et al. |
| 7,722,418 B2 | 5/2010 | Ellens et al. |
| 7,743,721 B2 | 6/2010 | Barrett et al. |
| 7,806,142 B2 | 10/2010 | Baros et al. |
| 7,905,156 B2 | 3/2011 | Scott et al. |
| 7,958,837 B1 | 6/2011 | Fraleigh |
| 7,975,638 B1 | 7/2011 | Harris et al. |
| 8,007,330 B2 | 8/2011 | Wong et al. |
| 8,025,006 B2 | 9/2011 | Baros |
| 8,028,510 B2 | 10/2011 | Scott et al. |
| 8,042,480 B2 | 10/2011 | Simons |
| 8,062,010 B2 | 11/2011 | Paramonoff et al. |
| D654,880 S | 2/2012 | Iam |
| 8,113,892 B1 | 2/2012 | Gable et al. |
| 8,141,789 B2 | 3/2012 | Schwartzman et al. |
| 8,145,371 B2 | 3/2012 | Rae et al. |
| 8,151,723 B2 | 4/2012 | Winiski et al. |
| 8,170,734 B2 | 5/2012 | Kaji |
| 8,182,396 B2 | 5/2012 | Martin et al. |
| 8,261,682 B1 | 9/2012 | DeVito |
| 8,264,338 B2 | 9/2012 | Leon |
| 8,347,859 B2 | 1/2013 | Garon et al. |
| 8,387,589 B2 | 3/2013 | Wong et al. |
| 8,406,944 B2 | 3/2013 | Garon et al. |
| 8,435,088 B2 | 3/2013 | Morettin et al. |
| 8,425,270 B2 | 4/2013 | Dudra et al. |
| 8,430,702 B2 | 4/2013 | Davidson et al. |
| 8,457,820 B1 | 6/2013 | Gonring |
| 8,516,916 B2 | 8/2013 | Scott et al. |
| 8,550,023 B1 | 10/2013 | Quail |
| 8,578,838 B2 | 11/2013 | Davidson |
| 8,578,873 B2 | 11/2013 | Gasper et al. |
| 8,583,300 B2 | 11/2013 | Oehlgrien et al. |
| 8,610,013 B2 | 12/2013 | Schmidt et al. |
| 8,612,072 B2 | 12/2013 | Garon et al. |
| D698,304 S | 1/2014 | Dubois et al. |
| D698,357 S | 1/2014 | Mainville et al. |
| 8,626,962 B2 | 1/2014 | Wong et al. |
| 8,631,753 B2 | 1/2014 | Morvillo |
| 8,672,086 B2 | 3/2014 | Wong et al. |
| 8,683,300 B2 | 3/2014 | Stek et al. |
| 8,751,015 B2 | 6/2014 | Frewin et al. |
| 8,769,944 B2 | 7/2014 | Redfern |
| 8,845,490 B2 | 9/2014 | Chan et al. |
| D720,305 S | 12/2014 | Wenji |
| 8,901,443 B2 | 12/2014 | Baker et al. |
| 8,930,050 B2 | 1/2015 | Garon et al. |
| 8,931,707 B2 | 1/2015 | Wilnechenko et al. |
| 8,957,338 B2 | 2/2015 | Li |
| D725,050 S | 3/2015 | Tsugawa et al. |
| D725,612 S | 3/2015 | Schlegel et al. |
| 8,992,273 B2 | 3/2015 | Winiski et al. |
| D727,190 S | 4/2015 | Higgs |
| 8,997,628 B2 | 4/2015 | Sall et al. |
| 9,032,898 B2 | 5/2015 | Widmark |
| 9,068,855 B1 | 6/2015 | Guglielmo |
| 9,104,227 B2 | 8/2015 | Clarke et al. |
| 9,233,740 B2 | 1/2016 | Morvillo |
| 9,260,161 B2 | 2/2016 | Gasper et al. |
| 9,278,740 B1 | 3/2016 | Andrasko et al. |
| 9,334,022 B2 | 5/2016 | Gasper et al. |
| 9,340,257 B2 | 5/2016 | Ulgen |
| D758,325 S | 6/2016 | Cook et al. |
| D758,975 S | 6/2016 | Hunter et al. |
| 9,377,780 B1 | 6/2016 | Arbuckle et al. |
| 9,423,894 B2 | 8/2016 | Olsson et al. |
| 9,459,787 B2 | 10/2016 | Kulczycki et al. |
| 9,522,723 B1 | 12/2016 | Andrasko et al. |
| 9,559,649 B2 | 1/2017 | Noh et al. |
| D782,987 S | 4/2017 | Gassner |
| 9,631,753 B2 | 4/2017 | Wood et al. |
| 9,745,020 B2 | 4/2017 | Snow |
| 9,689,395 B2 | 6/2017 | Hartman |
| 9,710,077 B2 | 7/2017 | Okazaki |
| 9,834,293 B2 | 12/2017 | Wood et al. |
| D807,309 S | 1/2018 | Johnson et al. |
| 9,857,794 B1 | 1/2018 | Jarrell et al. |
| 9,896,173 B2 | 2/2018 | Baros et al. |
| 9,911,556 B2 | 3/2018 | Lee et al. |
| 9,944,377 B2 | 4/2018 | Davidson et al. |
| 9,950,771 B1 | 4/2018 | Hartman et al. |
| D818,973 S | 5/2018 | Tang et al. |
| 9,978,540 B2 | 5/2018 | Tanaka et al. |
| 9,988,126 B2 | 6/2018 | Wood |
| 9,994,291 B2 | 6/2018 | Scott |
| 10,000,268 B1 | 6/2018 | Poirier et al. |
| 10,040,522 B1 | 8/2018 | Hartman et al. |
| 10,112,692 B1 | 10/2018 | Anschuetz |
| 10,202,179 B2 | 2/2019 | Wong et al. |
| 10,281,928 B2 | 5/2019 | Behling et al. |
| 10,358,189 B2 | 7/2019 | Sheedy et al. |
| 10,370,070 B2 | 8/2019 | Fetchko et al. |
| 10,386,834 B2 | 8/2019 | Green et al. |
| D858,465 S | 9/2019 | Desbiens |
| 10,431,099 B2 | 10/2019 | Stewart et al. |
| 10,457,371 B2 | 10/2019 | Hara et al. |
| D884,856 S | 5/2020 | Jones et al. |
| 10,647,399 B2 | 5/2020 | Davidson et al. |
| 10,671,073 B2 | 6/2020 | Arbuckle et al. |
| 10,683,073 B2 | 6/2020 | Redfern et al. |
| 10,683,074 B2 | 6/2020 | Davidson et al. |
| 10,696,368 B2 | 6/2020 | Mizutani et al. |

(56) References Cited

U.S. PATENT DOCUMENTS

| | | |
|---|---|---|
| 10,696,369 B2 | 6/2020 | Takase et al. |
| 10,766,590 B2 | 9/2020 | Nanjo et al. |
| 10,781,947 B2 | 9/2020 | Fetchko et al. |
| 10,829,191 B2 | 11/2020 | Wong et al. |
| 10,889,358 B2 | 1/2021 | Wong et al. |
| 10,906,623 B2 | 2/2021 | Chan et al. |
| 10,940,927 B2 | 3/2021 | Chan et al. |
| 11,000,268 B2 | 5/2021 | Poucher et al. |
| 11,040,757 B2 | 6/2021 | Huyge et al. |
| 11,155,322 B2 | 10/2021 | Baros |
| 11,319,916 B2 | 5/2022 | Strang et al. |
| 11,372,411 B1 * | 6/2022 | Derginer ............ G05D 1/0206 |
| 11,433,981 B2 | 9/2022 | Chan et al. |
| 11,465,726 B2 | 10/2022 | Nakatani |
| 11,467,583 B2 | 10/2022 | Mizutani |
| 11,530,022 B1 * | 12/2022 | Andrasko ............ B63H 25/42 |
| 11,679,853 B2 | 6/2023 | Wong et al. |
| 11,685,499 B1 * | 6/2023 | Arbuckle ............ B63H 20/12 |
| | | 114/144 R |
| 11,993,357 B2 * | 5/2024 | Ikegaya ............ B63B 79/40 |
| 12,017,746 B2 * | 6/2024 | Wong ............ B63H 25/42 |
| 2003/0082964 A1 | 5/2003 | Simner |
| 2005/0233655 A1 | 10/2005 | Maselter |
| 2007/0006101 A1 | 1/2007 | Michaels |
| 2007/0238370 A1 | 10/2007 | Morvillo |
| 2007/0276563 A1 | 11/2007 | Kaji |
| 2009/0076671 A1 | 3/2009 | Mizutani |
| 2009/0165694 A1 | 7/2009 | Beamer |
| 2010/0094491 A1 | 4/2010 | Oehlgrien et al. |
| 2010/0102173 A1 | 4/2010 | Everett et al. |
| 2010/0198435 A1 | 8/2010 | Cansiani et al. |
| 2011/0000268 A1 | 1/2011 | Schaafsma et al. |
| 2011/0120364 A1 | 5/2011 | Mueller |
| 2011/0143608 A1 | 6/2011 | Chiecchi |
| 2011/0151732 A1 | 6/2011 | Chiecchi |
| 2011/0320072 A1 | 12/2011 | Morvillo |
| 2012/0103774 A1 | 5/2012 | Jun |
| 2012/0247934 A1 | 10/2012 | Schmidt et al. |
| 2013/0213293 A1 | 8/2013 | Gasper et al. |
| 2014/0043303 A1 | 2/2014 | Baker et al. |
| 2014/0183011 A1 | 7/2014 | Park et al. |
| 2014/0224166 A1 | 8/2014 | Morvillo |
| 2014/0348207 A1 | 11/2014 | Wilnechenko et al. |
| 2014/0365050 A1 | 12/2014 | Morvillo |
| 2016/0097393 A1 | 4/2016 | Hartman |
| 2017/0250037 A1 | 8/2017 | Tanaka et al. |
| 2017/0313386 A1 | 11/2017 | Snow |
| 2017/0349257 A1 | 12/2017 | Hara et al. |
| 2018/0201342 A1 | 7/2018 | Huyge et al. |
| 2020/0303235 A1 | 9/2020 | Miyadate et al. |
| 2020/0354030 A1 | 11/2020 | Bowie |
| 2020/0391838 A1 * | 12/2020 | Inoue ............ B63H 20/10 |
| 2021/0107617 A1 | 4/2021 | Nakatani |
| 2021/0141396 A1 * | 5/2021 | Kinoshita ............ G05D 1/0875 |
| 2021/0173413 A1 * | 6/2021 | Derginer ............ G05D 1/49 |
| 2021/0291943 A1 * | 9/2021 | Inoue ............ B63B 39/061 |
| 2022/0004125 A1 | 1/2022 | Mitsumata et al. |
| 2022/0306257 A1 * | 9/2022 | Afman ............ B63H 20/12 |
| 2022/0334596 A1 | 10/2022 | Chan et al. |
| 2022/0355913 A1 | 11/2022 | Davidson et al. |
| 2023/0021635 A1 * | 1/2023 | Gallagher ............ B63B 79/40 |
| 2023/0030018 A1 * | 2/2023 | Ross ............ B63B 39/04 |
| 2023/0073225 A1 | 3/2023 | Chan et al. |
| 2023/0166823 A1 | 6/2023 | Wood et al. |
| 2023/0257096 A1 | 8/2023 | Wong et al. |
| 2023/0286634 A1 * | 9/2023 | Koga ............ B63H 21/17 |
| 2023/0303235 A1 | 9/2023 | Wong et al. |
| 2024/0116616 A1 * | 4/2024 | Moruzzi ............ G05G 5/065 |
| 2024/0132195 A1 * | 4/2024 | Hamada ............ B63H 21/21 |
| 2024/0132196 A1 * | 4/2024 | Shirao ............ B63H 25/46 |
| 2024/0182142 A1 * | 6/2024 | Filippou ............ B63B 79/10 |

FOREIGN PATENT DOCUMENTS

| | | |
|---|---|---|
| CA | 304073 A | 9/1930 |
| CA | 2236483 C | 5/1998 |
| CA | 2372402 C | 2/2002 |
| CA | 3048271 A1 | 6/2019 |
| CA | 3048276 A1 | 6/2019 |
| CA | 3048282 A1 | 12/2020 |
| CN | 109110073 A | 1/2019 |
| CN | 112124548 A | 12/2020 |
| DE | 19837888 C1 | 8/1998 |
| EP | 0928739 A2 | 7/1999 |
| JP | H0350087 A | 3/1991 |
| JP | H0382697 A | 4/1991 |
| JP | H03114996 A | 5/1991 |
| JP | 106255577 A | 9/1994 |
| JP | H09286390 A | 11/1997 |
| JP | 109315384 A | 12/1997 |
| JP | 2001294197 A | 10/2001 |
| JP | 2002-284087 A | 10/2002 |
| JP | 2003341589 A | 12/2003 |
| JP | 2004224103 A | 8/2004 |
| JP | 2005-280550 A | 10/2005 |
| JP | 2005324716 A | 11/2005 |
| JP | 2009037287 A | 4/2009 |
| JP | 2012-035786 A | 2/2012 |
| JP | 2013035351 A | 2/2013 |
| JP | 2013100102 A | 5/2013 |
| JP | 2014196091 A | 10/2014 |
| JP | 2018030573 A | 3/2018 |
| KR | 10-2011-0078767 A | 7/2011 |
| KR | 10-2011-0139800 A | 12/2011 |
| KR | 10-2012-0019280 A | 3/2012 |
| KR | 10-1259134 B1 | 4/2013 |
| KR | 10-1297596 B1 | 8/2013 |
| KR | 10-2013-0119071 A | 10/2013 |
| KR | 10-1491661 B1 | 2/2015 |
| KR | 10-2017-0143039 A | 12/2017 |
| KR | 10-2275079 B1 | 7/2021 |
| WO | 2003068590 A2 | 8/2003 |
| WO | 2006058232 A1 | 6/2006 |
| WO | 2008100903 A2 | 8/2008 |
| WO | 2009134153 A1 | 5/2009 |
| WO | 2010003905 A1 | 1/2010 |
| WO | 2011099931 A1 | 8/2011 |
| WO | 2011142870 A2 | 11/2011 |
| WO | 2016036616 A1 | 3/2016 |
| WO | 2016209401 A1 | 12/2016 |
| WO | 2023092228 A1 | 1/2023 |

OTHER PUBLICATIONS

Volvo Penta; Boat Trim System; Mar. 2017; 4 pgs.
Australian Boat Magazine; The Intriguing Zipwake Trim; May 2015; 6 pgs.
Interceptors/Trim Tabs/Force Producers for Ship Motion Control—Maritime Dynamics, Inc.
Auto TrimPro Electric Owner Install Guide; 48 pgs.
Trygve Lauvdal and Thor I. Fossen; Norwegian University of Science and Technology, Department of Engineering Cybernetics, n-7034 Trondheim, Norway; Nonlinear Non-Minimum Phase Rudder-Roll Damping System for Ships Using Sliding Mode Control; 6 pgs.
Asgei J. Sorenson; Department of Marine Technology, Norwegian University of Science and Technology ; 2013 Department of Marine Technology, Ntnu; Marine Control Systems, Propolsion and Motion Control of Ships and Ocean Sructures Lecture Notes; 536 pgs.
European Patent Office Extended European Search Report mailed Aug. 26, 2022 from corresponding European Patent Application No. 19869718.7; 7 pages.
WIPO, Canadian International Searching Authority, International Search Report mailed Dec. 13, 2019 in corresponding International Patent Application No. PCT/CA2019/051410, 3 pages.
WIPO, Canadian International Searching Authority, Written Opinion mailed Dec. 4, 2019 in corresponding International Patent Application No. PCT/CA2019/051410, 6 pages.
LENCO—We Make The Best Boats Better!; The World Leader In Trim Tab Systems & Hatch Lift Innovation Owner's Manual; May 21, 2019; 28 pgs.

(56) References Cited

OTHER PUBLICATIONS

International Search Report and Written Opinion, filed in PCT/US2022/038962 dated Nov. 16, 2022; 7 pgs.
International Search Report and Written Opinion, filed in PCT/US2022/038102 dated Nov. 15, 2022; 9 pgs.
International Search Report and Written Opinion, filed in PCT/US2022/038964 dated Nov. 28, 2022; 8 pgs.
International Search Report and Written Opinion, filed in PCT/US2022/040944 dated Dec. 2, 2022; 7 pgs.

* cited by examiner

DYNAMIC ACTIVE CONTROL SYSTEM WITH ENGINE CONTROL

CROSS-REFERENCE TO RELATED APPLICATION

This Application claims the benefit of and priority to U.S. Provisional Application No. 63/225,291, filed Jul. 23, 2021, the content of which is hereby incorporated by reference.

FIELD OF THE DISCLOSURE

The present disclosure generally relates to a stability control system with engine control for providing optimum performance and control of dynamic active motions of a marine vessel, watercraft or boat (collectively, a marine vessel for brevity). More particularly, the present disclosure is directed to an improved dynamic active control system (DACS) configured to receive data output from a plurality of sensors and control the deployment of the actuators to cause the vessel to operate with desired pitch, roll and yaw axis control.

BACKGROUND

The following terms and related definitions are used in the marine stabilization industry. "Trim Control" means the control of the average angle about the lateral or pitch axis of a marine vessel, averaged over one second or more. "List Control" or "Roll Control" means the control of the average angle about the longitudinal or roll axis of a marine vessel, averaged over one second or more. "Yaw Control" means the control of the average angle about the yaw axis of a marine vessel, averaged over one second or more. A "Water Engagement Device" or "WED" means a mechanical or electromechanical device configured to generates a variable amount of lift in a marine vessel by selective engagement of the device with or into the water flow under or adjacent to a transom surface of the marine vessel when the marine vessel is underway in a certain (or forward) direction or by changing the angle of attack of the device relative to the water flow during operation of a marine vessel in a forward direction. A WED can also be referred to as a Controller in the system disclosed herein and any reference to a Controller and/or a WED means the same device. A WED delta position is defined as the difference between port and starboard WED deployments. "Deployment" means selective engagement of the WED with or into the water flow or a change in the WED angle of attack. A Roll Moment in a marine vessel is the result of a force applied to the vessel that causes the vessel to rotate about its longitudinal or roll axis. A Pitch Moment in a marine vessel is the result of a force applied to the vessel that causes the vessel to rotate about its lateral or pitch axis. A Yaw Moment in a marine vessel is the result of a force applied to the vessel that causes the vessel to rotate about its vertical or yaw axis. For instance, (1) a "Roll Moment" can be generated if the port and starboard WEDs are deployed asymmetrically in a marine vessel that may cause the vessel to roll; (2) a "Yaw Moment" can be generated when port and starboard WEDs are deployed asymmetrically which may cause a heading change; and (3) a "Pitch Moment" can be generated if the port and starboard WEDs are deployed symmetrically or if a single WED is deployed about the center of the marine vessel which may cause the vessel to pitch.

Conventional marine stabilization techniques for when a vessel is underway in a forward direction include proportional deployment of WEDs to generate a continuous lift at the transom of the vessel for trim control while allowing adjustment of the angles (e.g., along the roll, pitch and yaw axis) of the marine vessel. A few examples of commercially available WEDs—not to be considered exhaustive by any means—are interceptors, trim tabs, and fins and other similar devices that can engage the water flow in similar fashion and provide similar functionality.

An alternate marine stabilization technique for when a vessel is not underway is a gyroscopic stabilization system that, in one of the commercially available versions, generates a torque that is proportional to the rate of precession and angular momentum. In such a gyroscopic stabilization system, a torque is applied to one or more axes depending on the orientation of the spin axis and its precession angle. The amount of torque applied to the roll, pitch and/or yaw axis can be calculated as a function of angular momentum, rate of precession, angle of precession, and precession orientation of the control moment gyroscope. The system disclosed herein makes it possible to calculate the engine steering angle change (or change in the rudder position) that would counter the torque applied about the yaw axis from a control moment gyroscopic stabilization system.

Marine stabilization technologies are key to experiencing the joy of cruising over waters without the attendant random environmentally induced disturbances of the boat. These disturbances—for example, a sudden unexpected roll—can be annoying and disruptive for boaters. In the existing prior art systems, WEDs are designed and configured to control list and trim—to get the marine vessel to an average angle in the roll and pitch axis. Smaller marine vessels used in the recreational market generally have manually actuated WEDs, while larger vessels operating in the commercial space use automatic actuated WEDs to stabilize the motion. However, such prior art systems do not combine DACS with engine control for complete vessel stabilization.

In addition, there are no currently available prior art recreational or commercial stability control systems that combine the fast deployment of WEDs with engine trim adjustments and engine steering angle adjustment. More specifically, prior art systems lack the combination of fast deployment of WEDs with adjustment of the engine steering angle of the marine vessel to counter changes in drag due to asymmetric deployment, gyroscopic stabilization yaw moment, and/or adjustment of the engine trim for dynamic control in the pitch axis.

In view of the foregoing disadvantages of prior art systems in the relevant field of marine stabilization, there is clearly a market need for an improved stability control system of a marine vessel—a dynamic active control system (DACS) configured to simultaneously control accelerations, rates and angles in the roll, pitch and yaw axes of the marine vessel and engine trim and engine steering angle adjustments of the marine vessel. The DACS disclosed herein provides significant technological advantages from conventional systems while overcoming the disadvantages of the prior art systems, as discussed below.

BRIEF SUMMARY OF THE DISCLOSURE

The present disclosure is directed to a DACS configured for simultaneous control of marine vessel motions in all three axes, namely pitch, roll and yaw by fast deployment and actuation of the WEDs. The DACS is configured with proprietary inertial sensing hardware and software in order to learn, capture and make a determination and/or predict the various motions of the marine vessel in all three axes and command deployment of the actuator blades to counteract any pitch, roll, and yaw motions of the vessel as well as total vessel pitch axis control facilitated by fast symmetric deployment of WEDs—alternatively referred as Controllers in the system disclosed herein—coupled with engine trim adjustments.

In an embodiment, the DACS is configured to provide total vessel roll axis and heading control by differentially deploying WEDs to counter rolling motions while simultaneously adjusting engine steering (or rudder) position to counter the steering moment associated with differentially deployed WEDs. In alternative embodiments, WEDs can be referred herein as Controllers and/or vice versa in the DACS disclosed herein. The novel DACS disclosed herein can (1) simultaneous control of motions in all three axes (total vessel pitch axis control) by fast symmetric deployment of WEDs, coupled with engine trim adjustments; (2) provide total roll and heading control by differentially deploying WEDs to counter rolling motions while simultaneously adjusting engine steering position to counter the steering moment associated with WED delta position; and (3) adjust the engine steering angle to counter yaw moments produced by gyroscopic stabilization systems. As disclosed herein, a total pitch axis control strategy includes symmetric deployment of a plurality of water engagement devices at a deployment speed of 100 mm/s or more while simultaneously adjusting an engine trim actuator. Similarly, a total roll and heading control strategy includes a differential deployment of the plurality of water engagement devices at a deployment speed of at 100 mm/s or more to counter a measured rolling motion while simultaneously adjusting a steering actuator to counter a measured yaw motion resulting from the differential deployment and adjusting the steering actuator to counter the measured yaw motion generated by a gyroscopic stabilization device adapted to be installed within the marine vessel.

In another embodiment, the DACS provides for automatically adjusting the engine steering angle to counter drag moment from a water engagement device delta position. The DACS comprises an embedded microprocessor based software module located within an operational console—the software module communicatively and operatively connected to the engine (via the engine control module) of the marine vessel. In software module can be configured to connect with third-party systems—e.g., navigational system—to connect and exchange data and information. At least one water engagement device actuator digitally connected to the software module—the water engagement device configured to read a signal input from the software module and automatically generate water engagement device delta position changes to counter the roll motion resulting from a steering position change.

As further explained in detailed below, the DACS comprises an engine having an embedded engine control module communicatively and operatively connected to the software module. A plurality of water engagement device actuators adapted to be mounted on a transom of the marine vessel and communicatively and operatively connected to the software module. During operation of the marine vessel, the software module is further configured to send a signal in order to command a desired water engagement device delta position and combat dynamic motions of the marine vessel. In addition, the software module is further configured to measure the relationship between an engine steering angle and the water engagement device delta position and provide a signal output to the water engagement device actuator. Specifically, the software module provides a first signal output to the plurality of water engagement device actuators to command a water engagement device delta position in order to combat dynamic motions of the marine vessel. Further, the software module measures a relationship between an engine steering angle and the water engagement device delta position and, in response thereto, provides a second signal output to the plurality of water engagement device actuators. On receiving the second signal the plurality of water engagement device actuators, in response thereto, automatically generate a change in the water engagement device delta position to counter a roll motion resulting from a steering position change.

The software module is embedded with a microprocessor-based control system, the software module is further communicatively and operatively connected to a plurality of sensors. In another embodiment, the plurality of sensors can be integrated (embedded) within the software module. A gyroscopic stabilization device adapted to be disposed on the marine vessel and communicatively and operatively connected to the software module is further provided within the system. During operation of the marine vessel, the control system measures motion of the marine vessel by the inertial sensor and provides a signal output to a steering actuator to adjust a steering position automatically (a) in response to a yaw axis motion measured by the inertial sensor, and (b) based on an empirical estimate of a yaw torque generated by the gyroscopic stabilization device and a water engagement device delta position commanded by the control system, respectively, in order to counter a measured change of an output from the steering position sensor.

The software module is further connected to a distribution module—the distribution module configured as a pass through module/device for wiring installation and providing a connection and distribution point for the various components of the DACS. The software module is further communicatively coupled to (1) a plurality of sensors (e.g., motion sensors positioned within the marine vessel); (2) a pair of actuators mounted adjacent the transom to deploy and retract the WEDs; and (3) an engine (or a propulsion unit) having an embedded engine-control unit (ECU) for providing adjustable trim, height and/or steering position/direction control; and/or (4) a gyroscopic stabilization device. The plurality of sensors comprises of at least one of the following: multi-axis inertial sensor for measuring rates or acceleration generated along multiple vector axes during the operation of the marine vessel; accelerometer sensor for measuring the longitudinal acceleration, lateral acceleration and vertical acceleration of the marine vessel respectively; Roll Rate Sensor (RRS), Pitch Rate Sensor (PRS) and Yaw Rate Sensor (YRS) to measure the roll rate, pitch rate and yaw rate of the marine vessel respectively. Further, at least one sensor, from the plurality of sensors is configured to measure data related to the WEDs/Controller retraction and deployment and measure and report data on steering angle, trim position, height of the engine during the vessel operation.

The software module may be further configured with proprietary machine learning/artificial intelligence algorithm for automatic optimization of the vessel operating characteristics and to predict motion and respond instantaneously to eliminate any undesirable vessel movements that are annoying, disruptive and uncomfortable for the operators or passengers of the vessel before they are felt by an operator. The artificial intelligence-based system is configured to learn how the boat is behaving in all three axes and automatically command deployment of the WEDs and/or adjustment of the engine trim, height and/or steering to counteract the pitch, roll, and/or yaw of the vessel for a perceived stable and controlled operation. Further, the AI-based system disclosed herein can make any necessary adjustment to the engine steering position to control the heading of the marine vessel.

During operation of the marine vessel, the software module may receive a signal (about the WED delta position), make a decision on what action is needed and then send a signal to the actuator to take that action—for example, counter the rolling motions and simultaneously adjust engine steering position to counter the steering moment associated with WED delta position. As disclosed herein, the system via the plurality of sensors located throughout the marine vessel (integrated or communicatively and operatively coupled to the software module) is capable of receiving the steering position from the engine via a digital communications bus and calculating the change of steering position across a certain timeline, relating the change in steering/rudder position to a change in roll angle and automatically adjusting the WED delta position as a result of this predicted change in roll angle.

In addition to the software module, the operational console comprises an optional multifunctional display unit and/or an operation input device (e.g., keypad)—the components communicatively and operatively connected to each other via digital communication buses. In another embodiment, the operational console functions as a control station for the operator of the marine vessel and can support a steering wheel, control lever or other similar devices or steering mechanism—other types of wheel, joystick, to maneuver the marine vessel. The software module communicatively coupled to the WEDs (or controllers) is further configured to a provide power, communications and/or data to the ECU, and the actuators for fast deployment of the WEDs.

In another embodiment, the DACS comprises an actuator having at least one WED/Controller mounted on the transom of the marine vessel and digitally connected to the software module. The system is capable of determining a desired WED delta position to combat dynamic motions of the marine vessel by measuring the relationship between an engine steering angle and the WED delta position, and monitoring and reading any data related to the WED delta position as an impending change in yaw rate, heading and roll angle of the marine vessel. Specifically, the system can (A) make the necessary adjustment to the engine steering angle to in order control the heading of the marine vessel and counter the resulting heading change from WED delta position; and (B) measure a change in steering position and predict the resulting roll motion generated from the steering position change, and automatically create WED/Controller delta position to counter the roll motion that will ultimately result from the steering position change.

As further described in the detailed disclosure, the DACS may be configured to provide total vessel yaw axis control to combat dynamic motions of the marine vessel in the yaw axis by monitoring measured yaw rates and differentially deploying the WEDs while simultaneously adjusting such deployment in response to a measured yaw rate to reduce the measured yaw rate. The system herein receives an operator command—a desired trim angle—and can (A) adjust the average positions of the WEDs as well as the engine trim angle in an effort to achieve the operator's desired trim angle; and (B) adjust the relationship between engine trim and WED average position to optimize either the performance of the DACS system or fuel efficiency of the engine of the marine vessel.

The DACS may be configured to monitor and read any data related to the differential deployment of the WEDs as an impending change in the yaw rate, heading and roll rate of the marine vessel. Based on the data received, the system can provide total roll axis and heading control by differentially deploying WEDs to counter roll axis moments while simultaneously adjusting engine steering position to counter the steering moment associated with differential controller deployment. The DACS may also be configured to adjust the engine steering angle to counter yaw moments produced by gyroscopic stabilization systems.

Certain embodiments are shown in the drawings. However, it is understood that the present disclosure is not limited to the arrangements and instrumentality shown in the attached drawings.

BRIEF DESCRIPTION OF THE DRAWINGS

The accompanying drawings incorporated in and forming a part of the specification illustrate several aspects of the present disclosure and, together with the description, serve to explain the principles of the embodiments. In the drawings.

DETAILED DESCRIPTION OF THE DISCLOSURE

For the purposes of promoting and understanding the principles disclosed herein, reference is now made to the preferred embodiments illustrated in the drawings, and specific language is used to describe the same.

Figure 1:
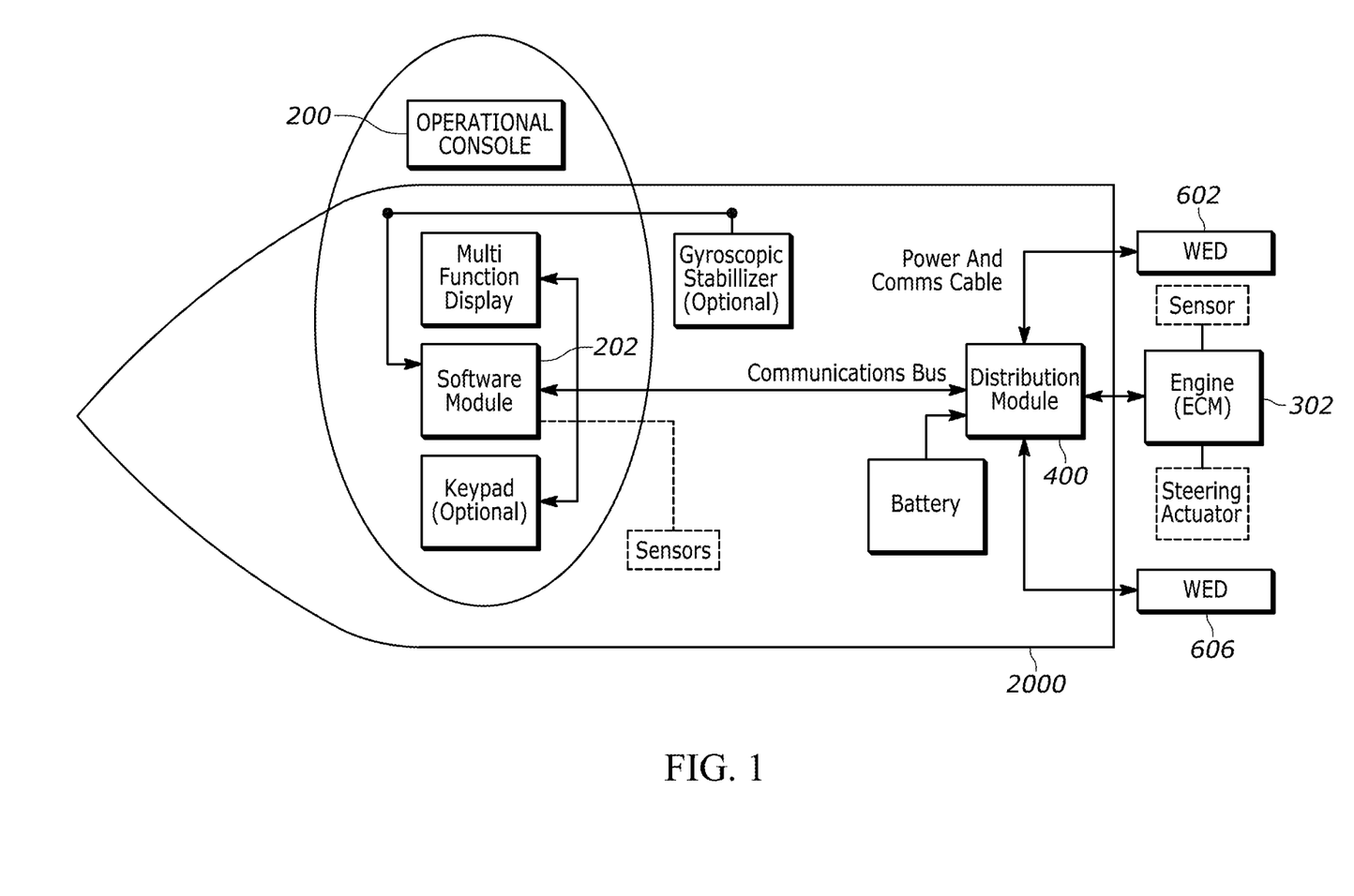
FIG. 1 illustrates an embodiment of the dynamic active control system with engine control comprising at least one pair of water engagement devices, a software module, an engine with engine control module, and a gyroscopic stabilization system connected to each other and various other modules and components according to one aspect of the present disclosure.

As illustrated in FIG. 1, the marine vessel 2000 comprises the DACS 1000 having a software module 202 located within an operational console 200 and mounted near the helm of the marine vessel 2000. The software module 202 is communicatively coupled to an engine having an embedded engine-control module 302 and a distribution module 400 located near the transom of the marine vessel 2000 and primarily used for supplying power and communication signals to the various components of the DACS 1000. The operational console 200 functions as a control station for the operator of the marine vessel and can support a steering wheel, control lever or other similar devices to steer and/or maneuver the marine vessel 2000. The software module 202 communicatively connected to the engine-control module 302 and configured to run the various operational algorithms for dynamic active control of the marine vessel 2000 provides for adjustable trim, height and/or steering position/ direction control of the engine. As further illustrated in FIG. 1, the operational console 200, in addition to the software module 202 can include an optional multifunctional display unit 202 and/or an operation input device 204 (e.g., keypad)—the components communicatively and operatively connected to each other via digital communication buses.

Referring back to FIG. 1, the software module 202 includes a memory, and an embedded programmable processor configured to read data on a vessel's performance characteristics from the memory and provide data to the processor in order to run various operational algorithms for dynamic active control of the marine vessel 2000. For example, any data related to operational performance of the marine vessel (e.g., data related to critical failure of the system or a component of the marine vessel) can be stored within the memory of the software module 202. A plurality of sensors are communicatively and operatively connected with the software module 202. As shown, the software module 202 is communicatively and operatively coupled to (1) a plurality of sensors (e.g., motion sensors positioned within the marine vessel); (2) at least one pair of actuators mounted adjacent the transom of the vessel 2000 to deploy and retract the WEDs (or Controllers) 602, 606; and/or (3) a gyroscopic stabilizer 500. In another embodiment, additional WEDs—for instance, two pairs of WEDs with actuators mounted adjacent the transom of the vessel 2000 configured to deploy and retract—which can also be referred to as WEDs 602, 604, 606, 608—the WEDs 602, 604, 606 and 608 are substantially same in structure and functions in substantially the same manner. In another embodiment, the plurality of sensors may be integrated or embedded within the software module 202. Further, at least one sensor, from the plurality of sensors, is configured to measure data related to the retraction and deployment of each of the WED/Controller (602, 606) and to measure and report data on steering angle, trim position, height of the engine during the vessel operation.

The software module 202—communicatively coupled to the engine control module 302 of the engine of the marine vessel 2000—is further configured to a provide power, communications and/or data to the actuators for fast deployment of the WEDs 602, 606. Further, as illustrated in FIG. 1, the software module 202 can be connected to other peripheral devices via digital communication buses—additional sensors (e.g., a GPS sensor, voltage sensors, encoders, current sensors, temperature sensor and/or other sensors)—the software module 202 primarily responsible for measuring, feeding data to the engine control module 302 and/or the actuators connected to the WEDs 602, 606 and measuring and computing various performance characteristics for dynamic active control of the marine vessel 2000.

As illustrated in the DACS 1000 disclosed herein, the distribution module 400 is mounted and located in proximity to the transom of the marine vessel 2000 wherein the operational console 200 (including the software module 202) are mounted near the helm and not in proximity to the transom of the marine vessel 2000. The various modules are communicatively coupled to each other—specifically the engine control module 302, the software module 202, and the actuators for the WEDs (602, 606)—via industry standard power and communication cables, The WED actuator mounted on the transom of the marine vessel—the WED actuator configured to provide fast deployment of the WEDs in 100 mm/s or more (mm/s)—preferably faster than 250 mm/s. During operation of the marine vessel 2000, the system 1000 is further designed to generate signals—for example, a wake signal—for the software module 202 to communicate a "power on" (wake up) status to the various components of the system—namely, the engine-control module 302 and other components (displays, input devices etc.) of the operational console 200 and the actuators for fast deployment of the WEDs/Controllers 602, 606.

Referring back to FIG. 1, the software module 202 is further configured to store and display certain information (e.g., route maps, chart plot, etc.) and provide reliable marine navigation and guidance to an operator of the marine vessel 2000. Such navigation and guidance include provisions for connecting to certain OEM-specific Internet Protocol (IP) for network interface identification and location addressing, and to provide easy-to-use User Interface (UI) for vessel operators. For instance, the software module 202 can provide yaw and trim correcting information/commands to the engine and steering system to prevent the marine vessel from deviating from the present course. The software module 202 is primarily an embedded computing device running a certain type of Linux or other operating system providing equivalent functionality. As mentioned above, the system 1000 also includes an additional number of user input devices, such as a keypad, a steering wheel and one or more throttle/shift levers. Each of the devices communicatively connected to the software module 202 are configured to provide commands (input signal) to the processor—the processor in turn, communicates with the actuator associated with the respective WED/Controller (602, 606) via the actuator power and communications cable—as shown in FIG. 1—and provides instructions to the actuator for fast deployment of the WEDs/Controllers 602, 606.

The software module 202 further comprises a plurality of multi-axis inertial sensors for measuring rates or acceleration generated along multiple vector axes during the operation of the marine vessel 2000. The software module 202 is configured to be communicatively and operatively connected to the plurality of multi-axis inertial sensors—including, for example, the accelerometer sensors for measuring accelerations along the x, y and z axes (longitudinal acceleration, lateral acceleration and vertical acceleration), sensors to measure the roll rate, pitch rate and yaw rate—Roll Rate Sensor (RRS), Pitch Rate Sensor (PRS) and Yaw Rate Sensor (YRS), respectively. Embodiments that may become obvious to those skilled in the art include 6-axis, 9-axis or magnetometer sensors or other similar sensors for various measurements—e.g., rates, accelerations, forces, torques etc.—generated during the dynamic active control of the vessel. The software module 202 communicatively connected to the WEDs 602, 606 can be programmed to act (make certain iterative decisions) based on information received from an attitude sensor (e.g., pitch and roll) as well as from a global positioning system (GPS) sensor located at a pre-selected fixed position on the marine vessel 2000.

Figure 2:
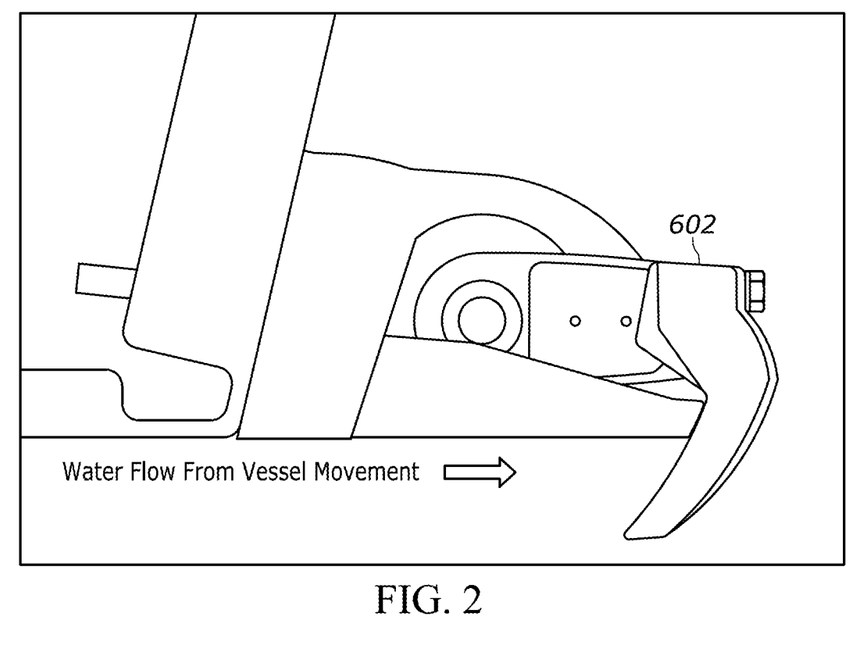
FIGS. 2 and 3 illustrate a fully deployed and a fully retracted water engagement device according to one aspect of the present disclosure.
Figure 3:
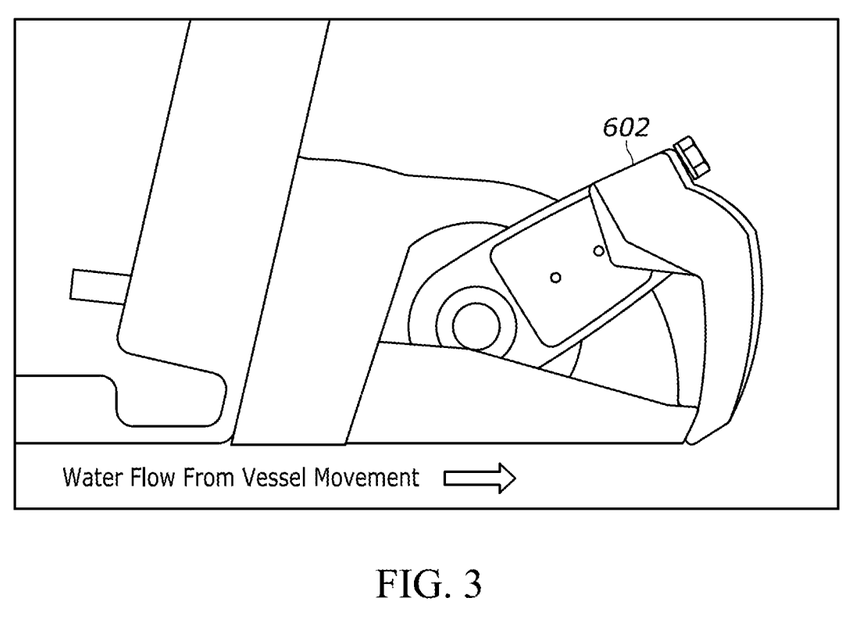

Referring back to FIG. 1, the DACS 1000 comprises at least one pair of WED actuators mounted on the transom of the marine vessel 2000 and configured for fast deployment of the WEDs 602, 606—the system 1000 providing total vessel pitch axis control by fast symmetric deployment of the WEDs 602, 606 coupled with engine trim adjustments. As illustrated, the WEDs 602, 606 mounted on the transom of the vessel 2000 and configured for fast deployment into the water at 100 mm/s or more—preferably faster than 250 mm/s. FIGS. 2 and 3 illustrate a fully deployed and a fully retracted water engagement device according to one aspect of the present disclosure.

Figure 4:
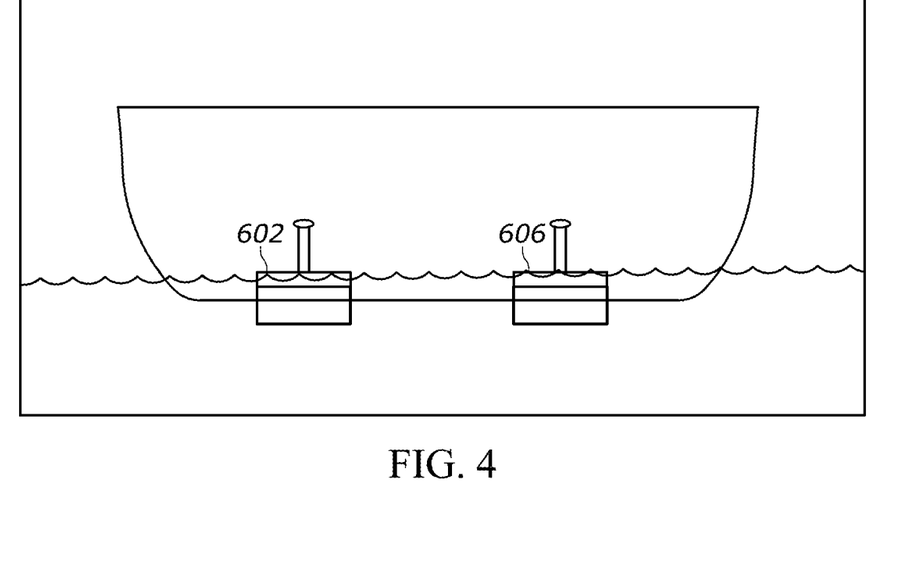
FIGS. 4 and 5 illustrate a symmetrical deployment and a differential deployment of at least one pair of water engagement devices according to one aspect of the present disclosure.
Figure 5:
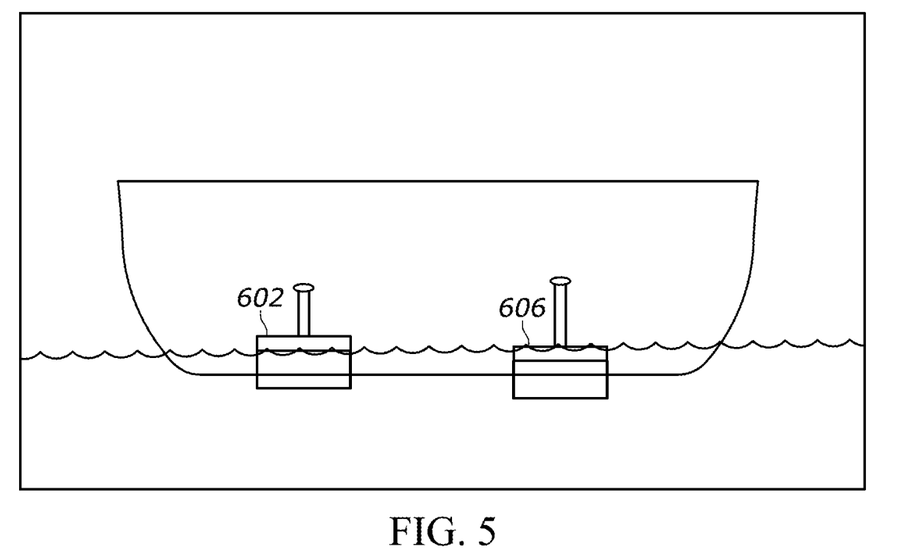

As illustrated in FIG. 4, the DACS 1000 is also configured to provide total vessel pitch control by symmetric deployment of the WEDs 602, 606 coupled with engine trim adjustment and providing optimum stability control of the vessel. For instance, if the WED 602 is halfway (50 percent) down, a sensor can send a signal to the software module 202 which in turn can command the actuator attached to the WED 602 to make adjustments both in the up and down positions for the WED 602. The DACS 100 can further optimize the relationship between the WED bias and the engine trim to deliver the best-case dynamic active control for the marine vessel. As further illustrated in FIG. 5, the system 1000 is further configured to provide total roll and heading control by differentially deploying WEDs 602, 606 to (1) counter rolling motions while simultaneously adjusting any engine steering position to counter the steering moment associated with WED delta position; and (2) providing adjustment of the engine steering angle to counter yaw moments produced by gyroscopic stabilization systems. The software module 202 comprising various algorithms running a proportional-integral-derivative control loop (PID) for continuously capturing data related to the difference between the commanded roll angle and the measured roll angle—the delta angle—and applying a responsive and accurate correction on the delta position between the WEDs 602 and 606 on the port and starboard sides of the marine vessel 2000 respectively (as shown in FIGS. 4 and 5).

In another aspect of the present disclosure, during operation of the marine vessel 2000, the system 1000 continuously monitors and measures data/feedback from the sensors and send command signals to instruct the actuator systems for fast deployment of WEDs 602, 606 to counteract certain dynamic active motions of the marine vessel (e.g., motions in the 0-3 Hz frequency spectrum across the roll, yaw and pitch axes) and provide the required dynamic active control of the marine vessel.

In another aspect of the present disclosure, DACS 1000 as disclosed herein is configured to make the necessary adjustment to the engine steering angle to control the heading of the marine vessel 2000 and counter the resulting heading change resulting from WED delta position. The DACS 1000 can measure a change in steering position and predict the resulting roll motion generated from the steering position change while automatically generating WED delta position to counter the roll motion that will ultimately result from this steering position change.

In another aspect of the present disclosure, the DACS 1000 is configured to adjust the vessel 2000 trim angle by symmetric deployment (shown in FIG. 4) of the WEDs 602, 606 coupled with engine trim adjustment. Controlling the engine trim adjustment gives the operator and/or the system the opportunity to optimize fuel efficiency or stabilization performance of the marine vessel 2000. The performance of the marine vessel 2000 is further optimized, by the DACS guaranteeing that the WEDs 602, 606 will maintain an average, non-zero position (or "bias") and adjusting the engine trim to enable the bias. In addition, the DACS 1000 is configured to optimize the engine trim for fuel efficiency purposes by delivering the commanded trim, even if that action results in less than optimum DACS performance.

In yet another aspect of the present disclosure, the DACS disclosed herein provides for at least two optimization strategies by allowing the DACS to be controlled by the WED average position as well as by the engine trim. The DACS is configured to receive a desired trim angle from the operator and adjust the average positions of the WEDs as well as the engine trim angle in an effort to achieve the operator's desired trim angle. As disclosed herein, the DACS is configured to adjust the relationship between engine trim and WED average position, and optimize either the performance of the DACS system or fuel efficiency of the engine.

In another aspect of the present disclosure, during operation as the marine vessel 2000 moves through the water the system 1000 is configured to adjust the engine steering position to counter the yaw moment (by measuring the changing drag force) associated with the WEDs 602, 606 delta deployment. The software module 202 can provide a signal to the engine control module 302 of the engine for adjusting the steering position of the engine.

Referring back to FIGS. 1-5, the DACS 1000 is configured to measure the relationship between the steering position of the engine and a desired WED delta position—the difference between starboard WED and port WED and their average positions. For instance, as the WED delta position is increased, the software module 202 sends a signal to the engine control module 302 to adjust the steering position of the engine of the marine vessel 2000. The ability of the system 1000 to counter the steering moment (by measuring the changing drag force) associated with the WED's delta deployment is instrumental in providing optimized total roll and heading control, as disclosed herein.

In another aspect of the present disclosure, the software module 202 is can receive and process data on the steering position of the engine of the marine vessel 2000. Specifically, the processor is programmed to measure the relationship between the steering position of the engine and the WED 602, 606 delta position. Based on the measured data, the software module 202 can generate and send predictive signals to the actuator to adjust the WEDs 602, 606 by differentially deploying each of the WEDs 602, 606 to counter rolling motions and simultaneously adjust the engine steering position to counter the steering moment associated with the WED delta position, as shown in FIG. 5. As further illustrated in FIGS. 4 and 5, the software module 202 can instruct the actuator mechanism to adjust the deployments of one or more of the WEDs—moving the WEDs 602, 606 (or additional WEDs) together or moving only one of the WEDs 602 or 606, or various patterned combinations of movements thereof. If more than one WED is moved, they may be moved in parallel or opposite to each other, to the deployments of the same magnitude as one another, or at different deployments, as needed simultaneously to counter unnecessary roll and pitch motions and optimize total vessel pitch axis control by fast symmetric deployment of coupled with engine trim adjustments.

In another aspect of the present disclosure, the DACS 1000 provides the operator with the option to control and change (if necessary) the commanded roll angle of the marine vessel 2000. During operation of the marine vessel 2000, if waves hit a boat on the starboard side the operator has the option to dynamically change the commanded roll angle and/or instruct the operator via the user interfaces of to tilt the boat down to the port side.

The processing and computing of the data—specifically the processing of signal by the software module 202 to change the deployment angles of the WEDs/Controllers 602, 606 based on the difference between the commanded and the actual (measured) roll angle, is one of the key innovative features of the improved DACS. An operator can change the commanded roll angle (e.g., −5 to 5 degrees) which triggers the decision loop within the control system and generates the output signal to instruct the actuator system for fast (at 100 mm/s or more) delta deployment of the WEDs 602, 606.

It is understood that the preceding is merely a detailed description of some examples and embodiments of the present disclosure, and that numerous changes to the disclosed embodiments may be made in accordance with the disclosure made herein without departing from the spirit or scope of the disclosure. The preceding description, therefore, is not meant to limit the scope of the disclosure, but to provide sufficient disclosure to allow one of ordinary skill in the art to practice the disclosure without undue burden. It is further understood that the scope of the present disclosure fully encompasses other embodiments that may become obvious to those skilled in the art.

Differential and differentially are defined within this document as unequal, off center and/or involving differences in: angle, speed, rate, direction, direction of motion, output, force, moment, inertia, mass, balance, application of comparable things, etc. The terms Dynamic and/or Dynamic Active Control may mean the immediate action that takes place at the moment they are needed. Any use of the term immediate, in this application, means that the control action occurs in a manner that is responsive to the extent that it prevents or mitigates vessel motions and attitudes before they would otherwise occur in the uncontrolled situation. A person of ordinary skilled in the art understands the relationship between sensed motion parameters and required response in terms of the maximum overall delay that can exist while still achieving the control objectives. Dynamic and/or Dynamic Active Control may be used in describing interactive hardware and software systems involving differing forces and may be characterized by continuous change and/or activity. Dynamic may also be used when describing the interaction between a vessel and the environment. As stated above, marine vessels may be subject to various dynamic forces generated by its propulsion system as well as the environment in which it operates. Any reference to vessel attitude may be defined as relative to three rotational axes including pitch attitude or rotation about the Y, transverse or sway axis, roll attitude or rotation about the X, longitudinal or surge axis, and yaw attitude or rotation about the Z, vertical or heave axis.

Various features of the example embodiments described herein may be implemented using hardware, software, or a combination thereof and may be implemented in one or more computer systems or other processing systems. However, the manipulations performed in these embodiments were often referred to in terms, such as determining, which are commonly associated with mental operations performed by a human operator. No such capability of a human operator is necessary in any of the operations described herein. Rather, the operations may be completely implemented with machine operations. Useful machines for performing the operation of the exemplary embodiments presented herein include general purpose digital computers or similar devices. With respect to hardware, a CPU typically includes one or more components, such as one or more microprocessors for performing the arithmetic and/or logical operations required for program execution, and storage media, such as one or more disk drives or memory cards (e.g., flash memory) for program and data storage, and a random access memory for temporary data and program instruction storage. With respect to software, a CPU typically includes software resident on a storage media (e.g., a disk drive or memory card), which, when executed, directs the CPU in performing transmission and reception functions.

The CPU software may run on an operating system stored on the storage media, such as, for example, UNIX or Windows (e.g., NT, XP, Vista), Linux, and the like, and can adhere to various protocols such as the Ethernet, ATM, TCP/IP, CAN, LIN protocols and/or other connection or connectionless protocols. As is known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include multiple separate CPUs, wherein each is dedicated to a separate application, such as, for example, a data application, a voice application, and a video application. Software embodiments of the example embodiments presented herein may be provided as a computer program product, or software, that may include an article of manufacture on a machine-accessible or non-transitory computer-readable medium (i.e., also referred to as "machine readable medium") having instructions. The instructions on the machine-accessible or machine-readable medium may be used to program a computer system or other electronic device. The machine-readable medium may include, but is not limited to, floppy diskettes, optical disks, CD-ROMs, magneto-optical disks, USB thumb drives, and SD cards or other type of media/machine-readable medium suitable for storing or transmitting electronic instructions. The techniques described herein are not limited to any particular software configuration. They may find applicability in any computing or processing environment. The terms "machine-accessible medium," "machine-readable medium," and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. It is to be noted that it is common—as a person skilled in the art can contemplate—in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed. It is understood that the preceding is merely a detailed description of some examples and embodiments of the present disclosure, and that numerous changes to the disclosed embodiments may be made in accordance with the disclosure made herein without departing from the spirit or scope of the disclosure. The preceding description, therefore, is not meant to limit the scope of the disclosure, but to provide sufficient disclosure to allow one of ordinary skill in the art to practice the disclosure without undue burden.

It is further understood that the scope of the present disclosure fully encompasses other embodiments that may become obvious to those skilled in the art. Features illustrated or described as part of one embodiment can be used in another embodiment to yield a still further embodiment. Thus, it is intended that the present disclosure cover such modifications and variations as come within the scope of the appended claims and their equivalents. It is to be understood by one of ordinary skill in the art that the present discussion is a description of exemplary embodiments only, and is not intended as limiting the broader aspects of the present disclosure, which broader aspects are embodied in the exemplary constructions.

The invention claimed is:

1. A dynamic active control system for a marine vessel, the system comprising:
   at least one sensor;
   a plurality of water engagement devices (each, a WED), each including an actuator configured to retract and deploy a water engagement element connected to the actuator, and each further configured to be mounted on a transom of the marine vessel, and wherein at least one of the plurality of water engagement devices is disposed on a first side of a longitudinal axis of the marine vessel and at least one of the plurality of water engagement devices is disposed on a second side of the longitudinal axis;
   a steering actuator, wherein the steering actuator is configured to adjust a heading of the marine vessel;
   a software module that is communicatively and operatively connected to the at least one sensor, the plurality of water engagement devices, and the steering actuator, wherein the software module is configured to:
   (a) receive, from the at least one sensor, a roll rate, a pitch rate, a yaw rate, a WED position for each of the plurality of water engagement devices, and a steering angle;
   (b) determine a water engagement device delta position based on a difference between the WED position received for the at least one water engagement device disposed on the first side of the longitudinal axis and the WED position received for the at least one water engagement device disposed on the second side of the longitudinal axis;
   (c) generate a first control signal based on the roll rate, pitch rate, yaw rate, and the water engagement device delta position, wherein the first control signal is configured to counteract dynamic motions of the marine vessel;
   (d) send, to the actuator for each of the plurality of water engagement devices, the first control signal, wherein the actuator of each of the plurality of water engagement devices is configured to change the WED position of the respective water engagement device in response to receiving the first control signal to counteract dynamic motions of the marine vessel;
   (e) generate a predicted roll moment of the marine vessel, wherein the predicted roll moment of the marine vessel is based on the roll rate, pitch rate, yaw rate, the water engagement device delta position, steering angle, and the first control signal;
   (f) generate a second control signal based on the predicted roll moment of the marine vessel and the steering angle, wherein the second control signal is configured to counteract a roll moment introduced to the dynamic motions of the marine vessel by the first control signal; and
   (g) send, to the steering actuator, the second control signal, wherein the steering actuator is configured to change the steering angle of the marine vessel in response to receiving the second control signal to counteract a roll moment introduced to the dynamic motions of the marine vessel by the first control signal.

2. The system of claim 1, wherein the software module automatically outputs, in response to the change in the steering angle a third signal to the water engagement devices to command a change in the water engagement device delta position to counter a roll moment resulting from the change in the steering angle.

3. The system of claim 1, wherein the at least one sensors includes a group of sensors embedded within the software module.

4. The system of claim 1, wherein the water engagement device delta position changes in 100 mm/s or more.

5. The system of claim 1, wherein the software module reads a change in the steering angle whether from a manual operator input or via an autopilot system input.

6. The system of claim 1, wherein the software module adjusts an average of the water engagement device delta position and a trim angle of an engine for a desired trim angle of the marine vessel in response to a commanded input for a desired marine vessel trim angle.

7. The system of claim 1, further comprising at least one input device communicatively and operatively connected to the software module.

8. The system of claim 3, wherein the at least one sensor comprises a multiple axis inertial sensor for measuring a rate of change or an acceleration along respective axes in relation to dynamic motions of the marine vessel.

9. The system of claim 3, wherein the at least one sensor comprises at least one Roll Rate Sensor (RRS), Pitch Rate Sensor (PRS) and Yaw Rate Sensor (YRS) to measure the roll rate, pitch rate and yaw rate of the marine vessel respectively.

10. The system of claim 1, wherein the at least one sensor comprises an attitude sensor communicatively and operatively connected to the software module such that in response to an output from the attitude sensor the software module outputs a fourth signal to the water engagement devices to command adjustment of the water engagement device delta position.

11. The system of claim 1, wherein the embedded microprocessor-based control system runs program instructions for a proportional-integral-derivative control loop that continuously captures data related to a difference between a commanded roll angle and a measured roll angle.

12. The system of claim 11, wherein the software module commands an adjustment of the water engagement device delta position in response to the difference between the commanded roll angle and the measured roll angle.

13. The system of claim 1, further comprising a distribution module disposed near the transom of the vessel, wherein the distribution module is operatively and communicatively connected to the software module, the steering actuator and the plurality of water engagement devices.

14. The system of claim 1, further comprising a steering position sensor associated with the steering actuator and communicatively and operatively connected to the software module for measuring the adjustment of the steering angle by the steering actuator.

15. The system of claim 1, wherein the at least one sensor comprises a global positioning system sensor communicatively and operatively connected to the software module such that in response to an output from the global positioning system sensor the software module outputs a fifth signal to the water engagement devices to command adjustment of the water engagement device delta position.

16. The system of claim 3, wherein the at least one sensor comprises an inertial sensor for measuring motion of the marine vessel and a steering position sensor, and further comprising a gyroscopic stabilization device adapted to be disposed on the marine vessel and communicatively and operatively connected to the software module, wherein the software module outputs a sixth signal to the steering actuator to adjust the steering position automatically (a) in response to a yaw axis motion measured by the inertial sensor, and (b) based on an empirical estimate of a yaw torque generated by the gyroscopic stabilization device and the water engagement device delta position commanded by the software module, respectively, in order to counter a measured change of an output from the steering position sensor.

17. The system of claim 1, wherein the software module receives an input for desired marine vessel trim angle from an input device and in response thereto adjusts an average water engagement device delta position and a trim angle of an engine.

18. The system of claim 16, wherein the software module adjusts a trim angle of an engine and an average water engagement device delta position to counter pitch moments resulting from the gyroscopic stabilization device.

19. The system of claim 1, wherein the embedded microprocessor-based control system runs program instructions for a total pitch axis control strategy comprising symmetric deployment of the plurality of water engagement devices at a deployment speed of at least 100 mm/s while simultaneously adjusting a trim angle of an engine.

20. The system of claim 1, wherein the embedded microprocessor-based control system runs program instructions for a total roll and heading control strategy comprising a differential deployment of the plurality of water engagement devices at a deployment speed of at least 100 mm/s to counter a measured rolling motion while simultaneously adjusting the steering actuator to counter a measured yaw motion resulting from the differential deployment and adjusting the steering actuator to counter the measured yaw motion generated by a gyroscopic stabilization device adapted to be disposed within the marine vessel.

21. The system of claim 3, wherein the at least one sensors includes a multiple axis inertial rate sensor and a steering position sensor, wherein the water engagement devices each include an actuator, a water engagement element connected to the actuator, and a position sensor communicatively and operatively connected to the actuator, wherein each actuator and position sensor is communicatively and operatively connected to the software module, and wherein the software module adjusts the water engagement device delta position in response to a dynamic roll axis motion measured by the multiple axis inertial rate sensor as a result of a change in an output from the steering position sensor.

22. The system of claim 21, wherein the water engagement element is deployed by the actuator at a deployment speed of 100 mm/s or more.

23. The system of claim 17, wherein the software module adjusts a relationship between the trim angle of the engine and the average water engagement device delta position to optimize a fuel efficiency of the engine.

24. The system of claim 1, wherein the steering actuator is connected to an engine such that movement of the steering actuator results in the change in the heading of the marine vessel.

25. The system of claim 1, wherein the steering actuator is connected to a rudder such that movement of the steering actuator results in the change in the heading of the marine vessel.

* * * * *